United States Patent [19]

Denton

[11] Patent Number: 5,520,737
[45] Date of Patent: May 28, 1996

[54] SHAFT COATING DEVICE AND METHOD THEREFOR

[76] Inventor: Russel C. Denton, P.O. Box 127, Prairie City, Oreg. 97869

[21] Appl. No.: 873,804

[22] Filed: Apr. 27, 1992

[51] Int. Cl.$^6$ ............................................. B05C 3/00
[52] U.S. Cl. ............................ 118/429; 118/400
[58] Field of Search ............... 118/DIG. 11, DIG. 12, 118/DIG. 13, 407, 429, 427, 400, 408, 404, 265; 15/257.05, 257.07; 141/20.5, 22; 401/9, 131, 143; 184/18, 27.1, 28

[56] References Cited

U.S. PATENT DOCUMENTS

| 406,665 | 7/1889 | Perine . | |
|---|---|---|---|
| 1,098,524 | 6/1914 | Palmer | 15/257.05 |
| 1,241,947 | 10/1917 | Fost | 15/257.075 |
| 1,326,389 | 12/1919 | Carson . | |
| 1,714,482 | 5/1929 | Schmuziger . | |
| 1,936,219 | 1/1933 | Westphal . | |
| 2,574,744 | 11/1951 | Koepke | 222/531 |
| 2,678,762 | 5/1954 | Zepelovitch | 15/257.075 |
| 2,805,641 | 10/1957 | Rosenthal | 15/257.07 |
| 3,889,628 | 6/1975 | Usab | 401/9 |
| 4,328,267 | 5/1982 | Matsuo | 118/DIG. 11 |
| 4,533,019 | 8/1985 | Leding | 184/14 |
| 4,607,727 | 8/1986 | Jochum | 184/38.1 |

*Primary Examiner*—Brenda A. Lamb

[57] ABSTRACT

The following invention relates generally to devices which facilitate the coating on a elongate shaft or pipe with a highly viscous substance for the benefits that attend having such a shaft or pipe coated with such a substance. In addition, the instant invention is directed to a method to facilitate the disposition of the substance on the shaft or pipe.

14 Claims, 7 Drawing Sheets

SHAFT COATING DEVICE AND METHOD THEREFOR

BACKGROUND OF THE INVENTION

In many industries, it is necessary or desirable to coat free ends of an elongate shaft with a substance to alter the properties of the shaft where the coating is disposed. For example, when working on mechanical structures such as vehicle engines or in other environments, it is frequently desirable to coat threaded shafts with an anti-seize compound so that after the threaded shaft has been secured to a component by means of a nut, and after the nut and threaded shaft have been exposed to severe environments such as repeated heat change, the presence of solvents or corrosives, etc. the nut will not have become "frozen" upon the bolt or threaded shaft so that the nut is still capable of removal through the use of wrench. Heretofore, threaded shafts and nuts not so treated with anti-seize compound may have to be cut or cracked off.

In addition, other trades such as plumbing sometimes require the use of flux when soldering pipes. Similarly, a liquid gasket-forming compound, commercially known as "Liquid Teflon" is sometimes desired to be applied along an area of an elongate shaft or pipe.

Many of these coating substances share in common certain attributes for which the structure and methodology of the instant invention give response and harness in a beneficial way. The substances are characterized in having a high viscosity, a relatively high density and consequently have the affinity to adhere to all things with which it contacts. Frequently these substances create a mess when contacting unwanted articles.

Various instrumentalities, known to exist in the past, have attempted to address some of the problems noted hereinabove at least for certain substances having similar characteristics. The following patents reflect the state of the art of which applicant is aware and these patents are tendered herewith to discharge applicant's acknowledged duty to disclose prior art. It is respectfully submitted, however, that none of these patents teach singly or render obvious when considered in any conceivable combination the nexus of applicant's invention as set forth hereinafter and as especially claimed.

| INVENTOR | PATENT NO. | ISSUE DATE |
|---|---|---|
| Perine | July 9, 1889 | 406,665 |
| Carson | December 30, 1919 | 1,326,389 |
| Schmuziger | May 21, 1929 | 1,714,482 |
| Westphal | November 21, 1933 | 1,936,219 |
| Koepke | November 13, 1951 | 2,574,744 |
| Leding | August 6, 1985 | 4,533,019 |
| Jochum | August 26, 1986 | 4,607,727 |

For example, the patent to Koepke teaches the use of a lubricator in which a spring-biased valve allows cooperation with an interior of a lubricant-containing compartment. This device is actuated by depressing the tip or nozzle from the FIG. 1 position to the FIG. 2 position, as by placing it in tangential registry with the area to be lubricated. This axial translation of a center core of the Koepke device seals off ports from a lubrication reservoir and forces the lubrication out the nozzle. By way of contrast, the instant invention does not deliver the viscous substance at pressure and out a nozzle, but allows an elongate object such as a shaft to overcome a check valve and become coated with the viscous substance while inside the well area that contains the viscous substance. Subsequent ejection of the bolt shaft by the energy stored in a spring that works with the check valve pushes the shaft out and then means uniformly removes excess coating from the shaft so that the disposition of the viscous substance on the shaft is appropriate for subsequent, immediate utilization.

The patent to Schmuziger teaches the use for a device to facilitate the discharge of paint or the like in which a "lid" is loosely placed on the liquid in a container. Access to the liquid below the lid is facilitated by means of a central opening communicating with an upwardly extending funnel. The instant invention is distinguished over this patent in a multiplicity of ways. For one, this patent does not give adequate response to a scenario which would include the container being inverted. For another, the substance held within the container is exposed to air and therefore may be susceptible to degradation.

The remaining citations show the state of the art further.

SUMMARY OF THE INVENTION

The instant invention is distinguished over the known prior art in a multiplicity of ways. In its most elemental form, a well is provided within which the viscous substance is contained. The well is configured as an open top container whose opening has been occluded by means of a piston adapted to telescopically reside within the well tightly so that a minimal air space exists between the area of telescopic engagement between the piston and the well. Although the drawings suggest a well and piston having substantially annular outer configurations, other geometric forms may also be equally applicable to the structure according to the instant invention. The area of interface between the well and the piston can be optimized by any of the multiplicity of different types of seals extending therebetween.

The piston has a substantially flat top surface and bottom surface and includes at least one bore passing therethrough. In some instances the top or bottom surfaces of the piston may be provided with relief areas as will be described. In any event, the at least one bore passing through the top and bottom of the piston allows fluid communication between the exterior of the coating device and the viscous substance contained within the well.

The communication between the exterior of the device and the substance contained within the well through the bore is interrupted by means of a ball check valve which is spring-biased to urge a check valve against a seat adjacent a topmost bore portion and near the top surface of the piston so that access to the viscous substance contained within the well is achieved only by overcoming the spring-biasing force. Furthermore, that same force becomes available in the spring for the purpose of overcoming the vacuum created during the extraction of the shaft, ejecting the shaft. A multiplicity of such ball check bores may be provided.

Access to the viscous substance within the well may also be achieved by means of a dauber-type brush which engages a bore not having a ball check valve. In utilizing a dauber-type brush, a stem portion of the brush includes a threaded portion adapted to engage corresponding threads in the bore for sealing engagement therewithin. The dauber-brush is preferably centrally located on the piston to facilitate transport of the device from one location to another. Thus, the dauberbrush is provided with an eyelet on an exposed extremity thereof projecting above the piston to provide a convenient finger hole to transport the device. The viscosity of the substance in conjunction with the sealing arrangement existing between the piston and the well provides a form of suction-type vacuum which thwarts separation of the piston from the well.

OBJECTS OF THE INVENTION

Accordingly, it is a primary object of the present invention to provide a new and novel instrumentality to facilitate the coating of a elongate object with a viscous substance, and to define a method therefore.

A further object of the present invention is to provide a device as characterized hereinabove which is durable in construction, easy to use and lends itself to mass production techniques.

A further object of the present invention is to provide a device as characterized above which improves over all prior instrumentalities and methods for coating a viscous substance on an elongate shaft.

A further object of the present invention is to provide a device as characterized above which maintains the freshness of the viscous substance contained within the well and is protected from contamination by the piston.

Viewed from a first vantage point, it is an object of the present invention to provide a device for coating the exterior of an elongate shaft with a viscous substance which includes:

a well containing the viscous substance, the well including a bottom wall and having a perimeter edge, a peripheral wall which extends linearly from said perimeter edge and terminates in a peripheral lip at a top portion of the peripheral wall remote from the bottom wall, a piston dimensioned to be received within the peripheral wall, the piston having an exterior surface complemental to an interior of the peripheral wall to facilitate telescoping interengagement therebetween, the piston having a top surface and a bottom surface on respective top and bottom extremities of the piston exterior surface, a bore in the piston passing through both the top and bottom surfaces and containing the viscous substance within the bore, and check valve means in an upper portion of the bore, the bore dimensioned to receive the elongate shaft therewithin, whereby the elongate shaft overcomes the check valve in entering the bore and is coated with the viscous substance contained in the bore and is ejected by spring tension.

Viewed from a second vantage point, it is an object of the present invention to provide a method for coating an elongate shaft with a viscous substance, the steps including:

loading into a well some of the viscous substance, dimensioning a piston to slide within the well, placing a bore in the piston, placing the piston in the well, providing a check valve in the piston bore, inserting the elongate shaft in the bore by overcoming the tendency of the check valve to remain closed, such that the shaft contacts the viscous substance in the bore which has migrated into the bore from the well, and removing the thus coated shaft from the bore.

Viewed from a third vantage point, it is an object of the invention the present invention to provide device for coating a shaft with a viscous substance, comprising:

an open topped well containing the viscous substance therewithin, a piston having spaced parallel planar surfaces and a plurality of bores extending through the planar surfaces, the piston placed in the well such that one planar surface sits on the viscous substance and the piston floats on the viscous substance, sealing means between the piston and the well to thwart migration of the viscous substance therebetween, and check valve means in the plurality of bores to control the through passage of the shaft and viscous substance there beyond.

These and other objects will be made manifest when considering the following detailed specification when taken in conjunction with the appended drawing figures.

BRIEF DESCRIPTION OF THE DRAWING FIGURES

Figure 7:
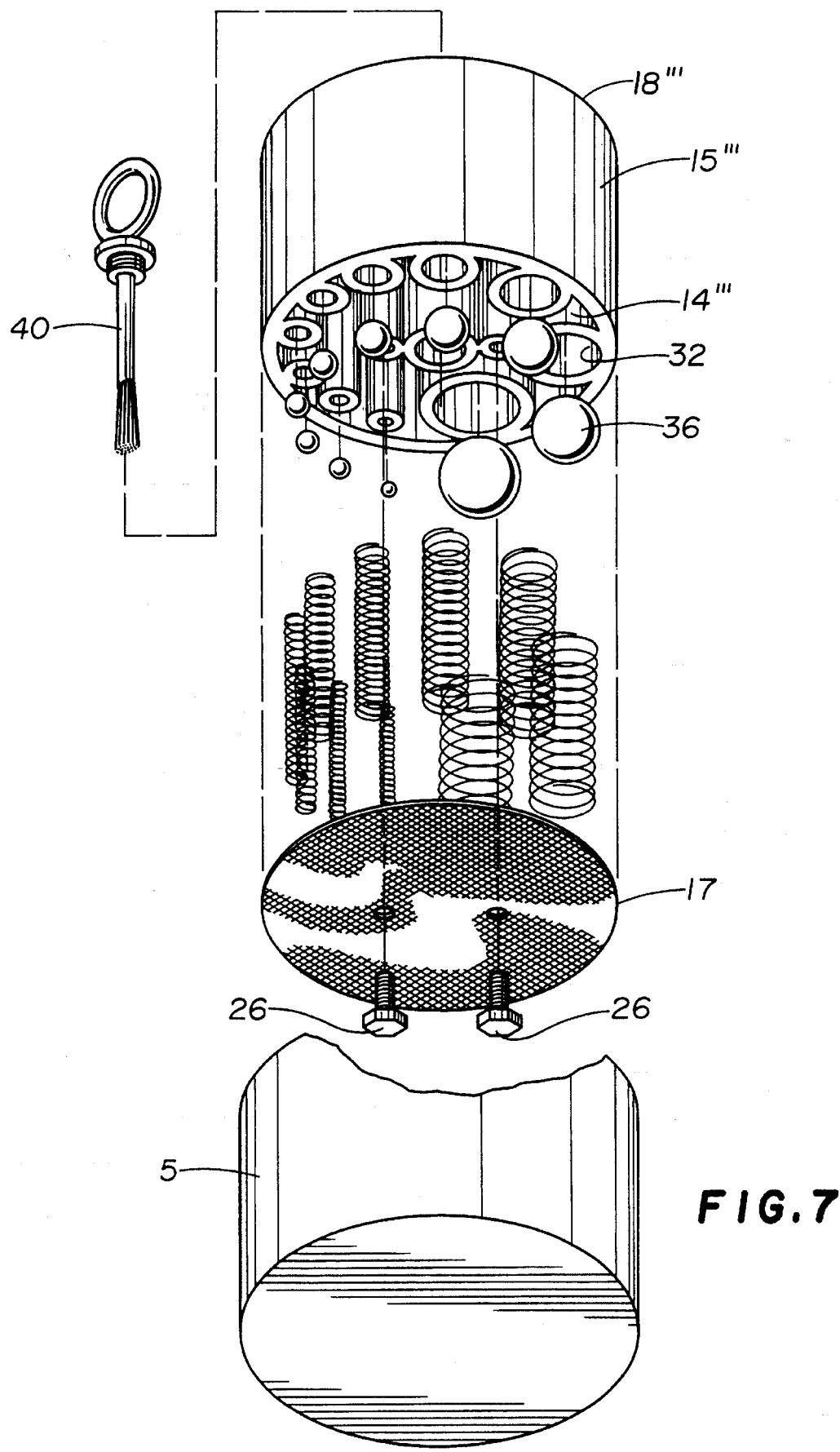

FIG. 7 as an exploded parts perspective of the apparatus according to the present invention according to a fourth embodiment.

Figure 7A:
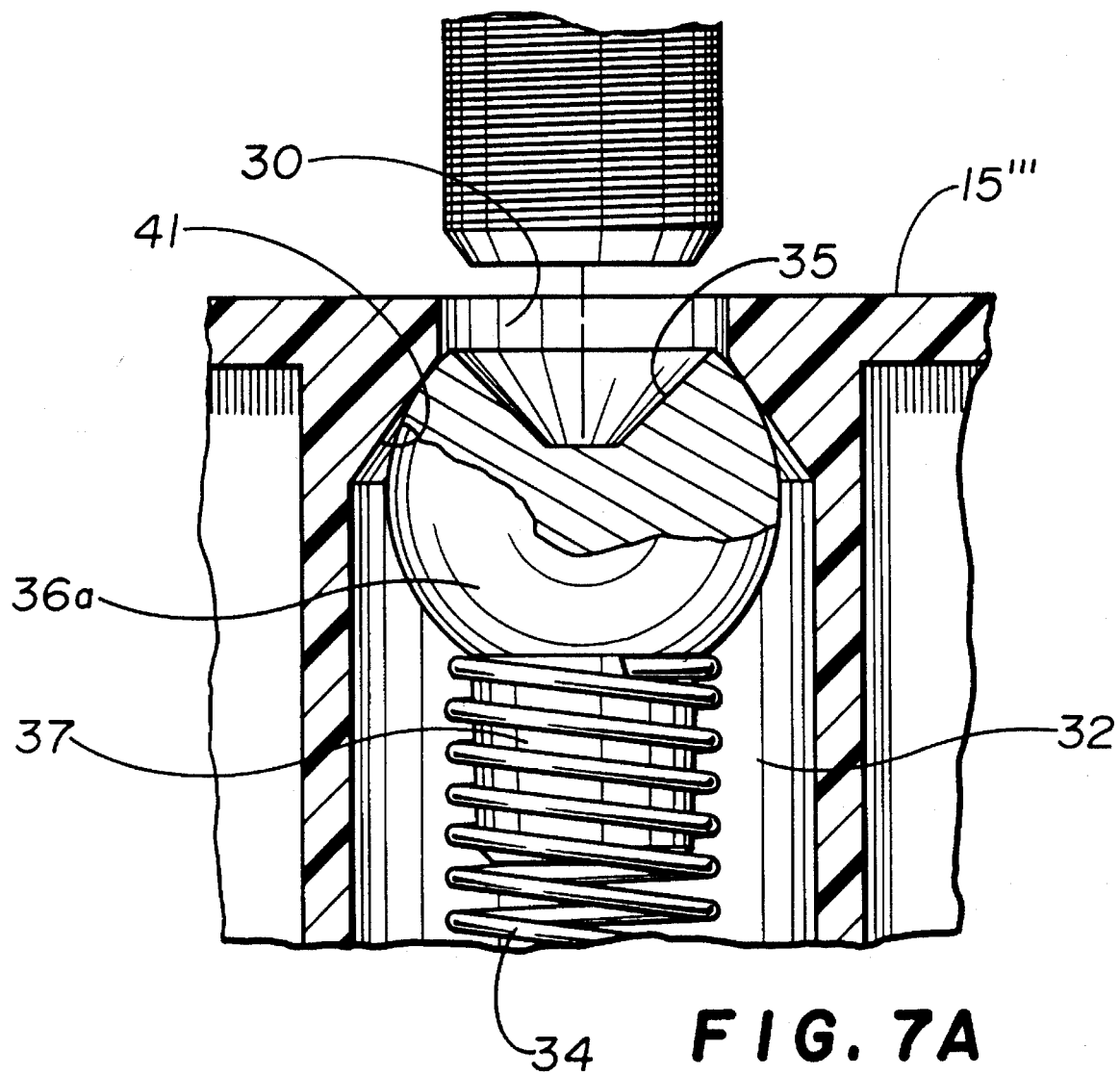

FIG. 7A is a sectional detail of one aspect of the invention shown in FIG. 7.

Figure 7B:
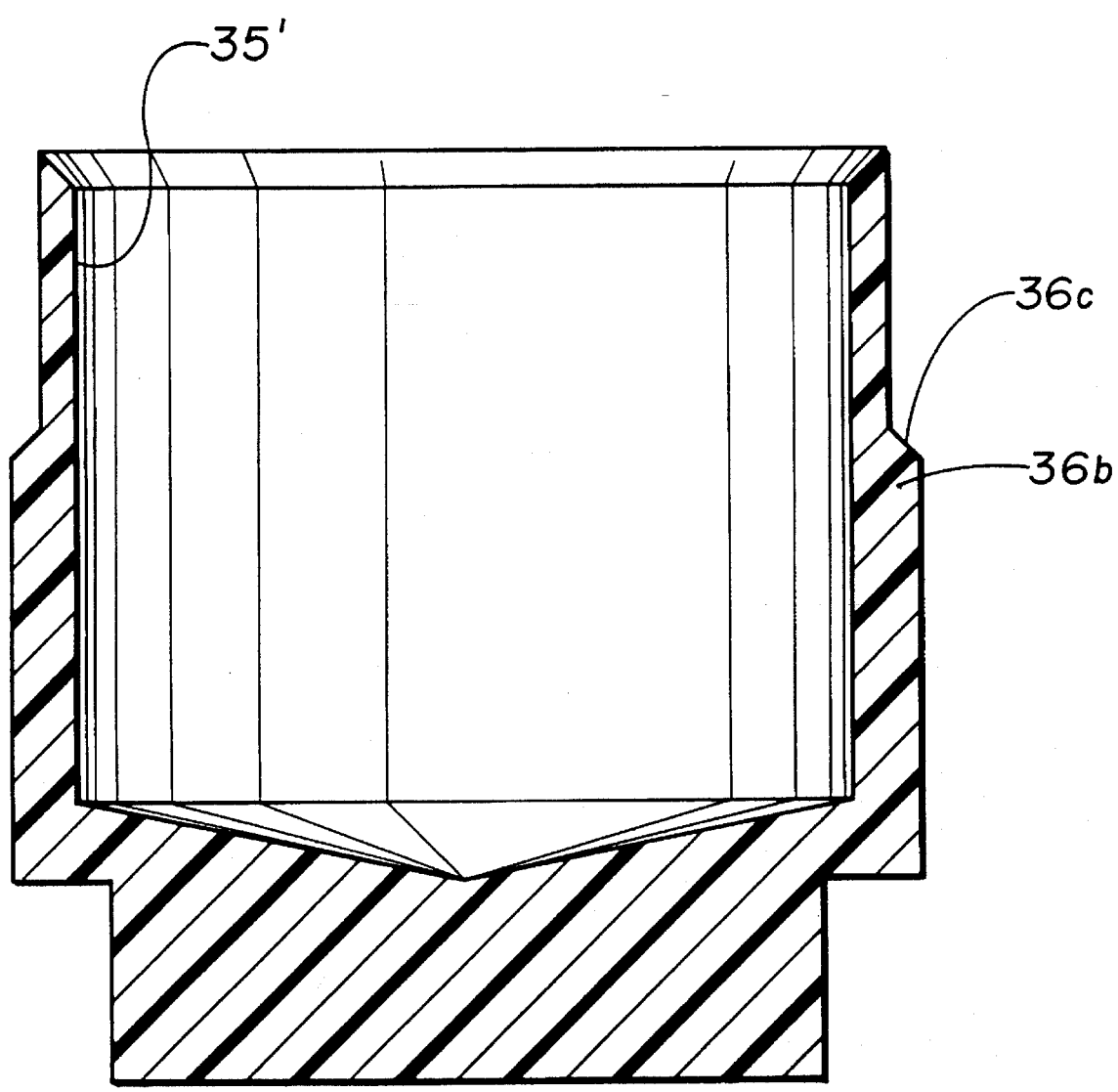

FIG. 7B is a variant of FIG. 7A.

DESCRIPTION OF PREFERRED EMBODIMENTS

Referring to the drawings now, wherein like reference numerals refer to like parts throughout the various drawing figures, reference numeral 10 is directed to the apparatus according to the present invention in one form.

In its essence, the apparatus 10 describes a coating device adapted to coat the exterior surface of an elongate object such as a shaft. The coating device 10 includes a well 5 having an open top and adapted to receive a viscous substance therewithin. A piston 15 is dimensioned to lie on top of the viscous substance contained within the well and a bore 32 extends through the piston and is provided with check valve means to selectively occlude access through the bore to the viscous substance contained within the well. Thus, an elongate shaft S can selectively engage and be coated by the viscous substance upon axial penetration of the shaft S within the bore 32.

Figure 1:
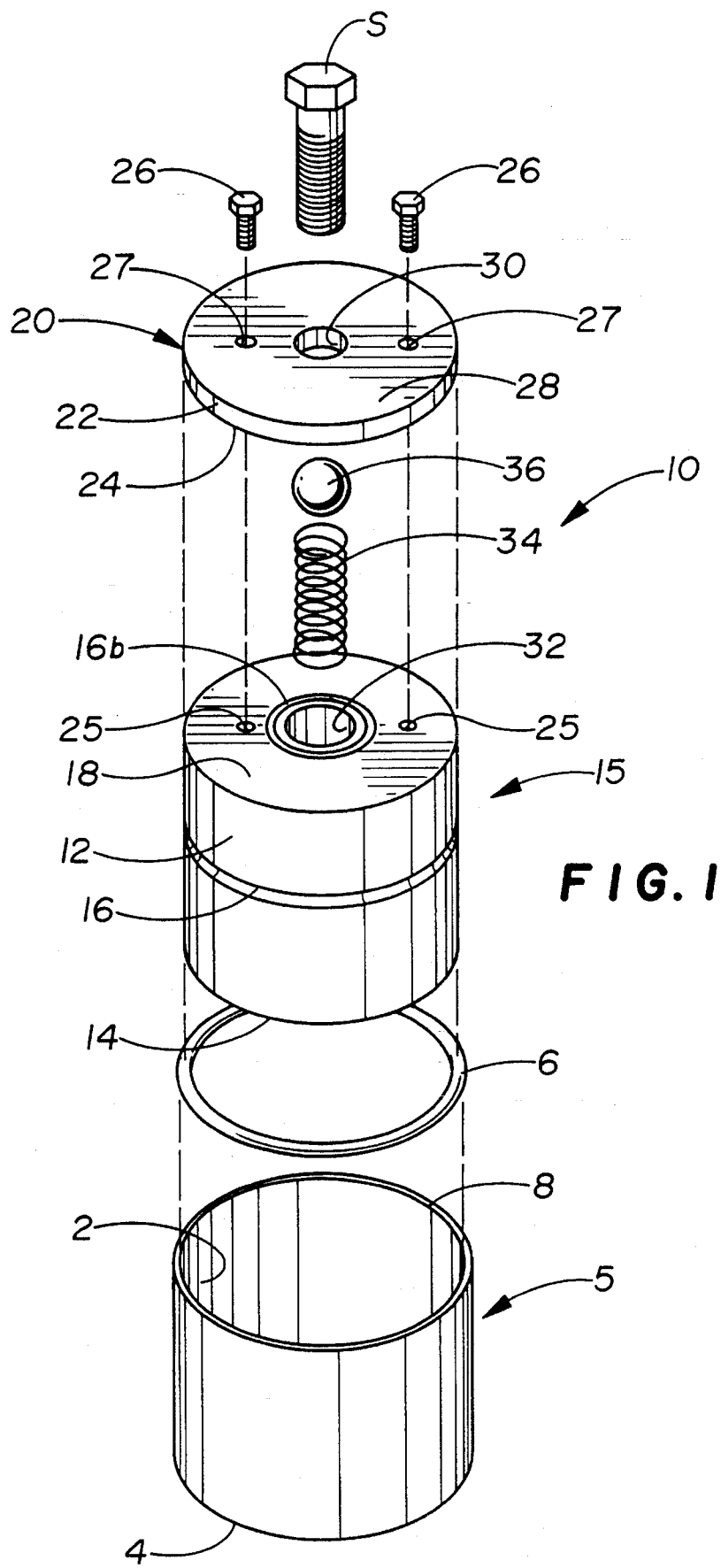
FIG. 1 is a perspective view of the various components, in exploded parts configuration, forming the invention according to one aspect.

More particularly, and with specific reference to FIG. 1, the following structure shall now be made evident. The well 5 is in essence an open top container formed from a bottom wall 4 having a perimeter edge which is integrally formed to an upwardly extending peripheral wall 2. An extremity of the peripheral wall 2 remote from the bottom wall 4 defines a top peripheral lip 8. The well 5, shown in FIG. 1, suggests a substantially open top cylindrical container, although this is merely illustrative. Other shapes, such as an oval, square or rectangular container for example may also be used as should now be evident.

FIG. 1 also reflects the existence of a piston 15 aligned above the well 5 for a telescopic placement therewithin. The piston 15 would have a similar exterior surface 12 complemental to an interior of the peripheral wall 2 for "close" tolerance telescopic engagement therebetween irrespective of the external geometrical configuration shown. The piston 15 also includes a bottom surface 14 and a top surface 18 both of which in this example are substantially circular. The top and bottom surfaces are preferably oriented in spaced parallel planes separated one from the other by the cylindrical exterior surface 12. In one form of the invention, a seat 16 is recessed within the cylindrical exterior surface 12, and describes an annular seat adapted to secure and support an O-ring type seal 6 reflected in FIG. 1.

The piston 15 is provided with at least one bore 32 shown in FIG. 1 as being centrally disposed and extending through the piston between the top and bottom surfaces 18, 14. The bore allows communication from the top surface 18 through to the bottom surface 14 and therefore allows access to the viscous substance within the well 5. In this embodiment, the bore 32 is of substantially uniform circular cross-section along its entire length.

FIG. 1 also reflects the existence of a cap 20 adapted to be fixedly secured to the top surface 18 of the piston. In essence, the cap 20 is a substantially disk shaped puck having an annular exterior side 22 and a substantially circular cap bottom 24 and cap top 28. The piston 15 is provided with threaded holes 25 adapted to lie in underlying registry with unthreaded holes 27 which pass through the cap 20. Thus, screws 26, which pass from the cap top 28 and through the cap extending out beyond the cap bottom 24, threadedly engage the threaded holes 25 to secure the cap 20 to the top surface 18 of the piston 15. The threaded holes 25 have a thread pitch complemental to the pitch of threaded screws 26 to allow the removable fastening of the cap 20 to the piston. The cap 20 also includes a central bolt hole 30 which serves as a ball stop to be described.

Figures 2, 3:
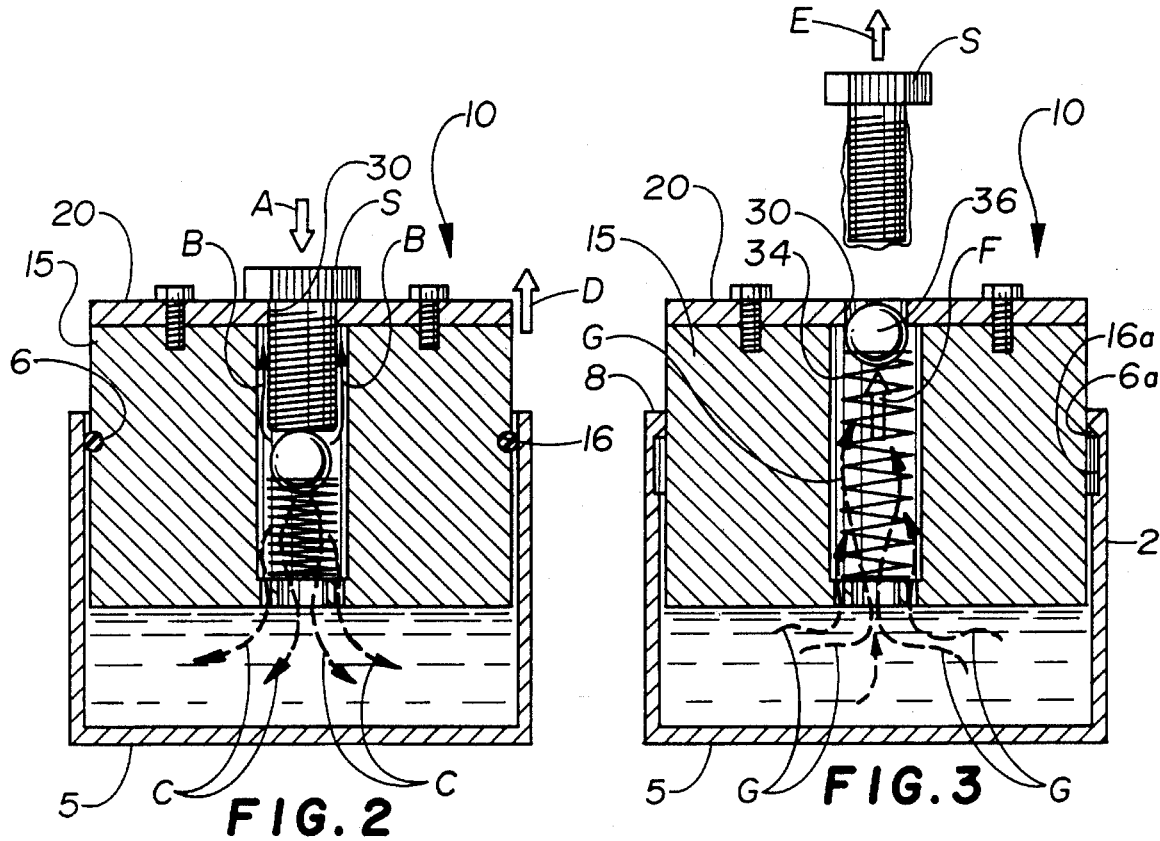
FIG. 2 is a sectional view of that which is shown in FIG. 1 when the device is assembled and cut along a vertical section line midway through the device.
FIG. 3 is similar to FIG. 2 showing the device in a second stage of manipulation and also reflecting a modification from that which is shown in FIG. 2.

With general reference to FIGS. 2 through 4, the interior bore 32 of the piston is of substantially uniform circular cross-section except at a bottommost portion. Thus, at the bottom a narrowed area exists to serve as a seat support for a spring 34. In turn, the spring has a check ball 36 disposed at a topmost end thereof, adjacent the top surface 18 of the piston. The check ball 36 is captured within the bore 32 by means of the cap 20. Thus, the bolt hole 30 of the cap serves as a ball stop to capture the ball 36 therewithin.

With respect to FIGS. 2 through 4, the bottom of the bore 32 is provided with an obstruction that includes a multiplicity of weep holes 38. Although the spring 34 rests upon the obstruction, fluid communication with the contents of the well is still possible through these weep holes 38. In one form of the invention, the weep holes 38 describe a multiplicity of accurate slots circumscribing a central opening 39 which has a diameter that is less than the diameter of the spring 34. Thus, the viscous substance is allowed to migrate up through the interior of the bore through the weep holes 38 and opening 39 as shown in FIGS. 3 through 4.

More particularly, FIG. 2 reflects the extreme situation when the insertion of an elongate shaft S (such as a bolt) has been inserted its full extent by application of a downward force as suggested by the arrow "A" of FIG. 2. Assume initially that the bore 32 is filled with the viscous substance and the ball check 36 is at its uppermost extremity (as suggested in FIG. 3). Upon depressing the ball check 36 downwardly (i.e. forced by the displacement of the shaft S along arrow A) the viscous substance will migrate in two directions: one direction is up against the annular periphery of the threaded bolt along arrow B. This upward migration is limited by the dimension of the ball check 36 in the bore 32 and the tolerance that exists between the bolt hole 30 and the clearance with respect to the threaded shaft bolt S. Thus, the threads on the bolt shaft S are uniformly coated. The representation of the viscous substance migrating upwardly along the threads of the shaft S, denoted by arrow B provides the coating of the shaft S; the opening 30 scrapes off excess coating. The viscous substance also migrates in a second direction along arrows C back into the well 15. This may cause a slight vertical translation of the piston associated in the well along the arrow D shown in FIG. 2.

FIG. 3 reflects the threaded bolt shaft S being removed in accordance with the arrow E shown in FIG. 3. The spring 34 will expand and force the check ball 36 to abut against the ball stop/bolt hole 30 shown in FIG. 3. This is because the spring 34 was placed under a compressive force (FIG. 2) which was then released by moving the bolt in the direction of the arrow E, causing the spring 34 to exert a force along the arrow F which urges the check ball 36 to occlude the bolt hole opening 30. Along with this check ball migration, the viscous substance within the well is urged to migrate along the arrows G and fill up the bore 32. Thus, the bore 32 and the coating device 10 is ready for reception of the next threaded bolt shaft as should now be evident. Note that in FIG. 3 a modification of the seal 6, shown in FIGS. 1 and 2, exists.

Whereas in FIGS. 1 and 2 an O-ring type seal 6 communicates with a seat 16 formed on the piston, in the FIG. 3 embodiment, the peripheral wall 2 of the well 5 is provided with a wiper-type seal 6a at the peripheral top lip 8. This wiper-type seal 6a takes the configuration of an inwardly directed substantially V-shaped (in cross-section) annular area of contact against a substantially smooth annular exterior surface of the piston 15. Immediately below the wiper seal 6a there is provided a thin wall section 16a of the peripheral wall 2 of the well 5. It is contemplated that the peripheral wall 2 of the well 5 is made from a resilient material which, especially in the presence of the piston 15, causes the wiper seal 6a to exhibit an increased force radially inwardly to enhance its adhesion to the exterior surface 12 of the piston 15. This serves as a wiper thereagainst. Stated alternatively, the top peripheral lip 8 and its wiper seal 6a exhibit an inwardly directed resilient memory which firmly grasps the piston 15 and exhibit a tendency to wipe the piston clean of all the viscous substance as the piston 15 travels vertically within the well. The thin wall relief section 16a allows for accumulated substance to be temporarily collected therewithin prior to migration back down into the bottom of the well 5.

Figures 4A, 4B:
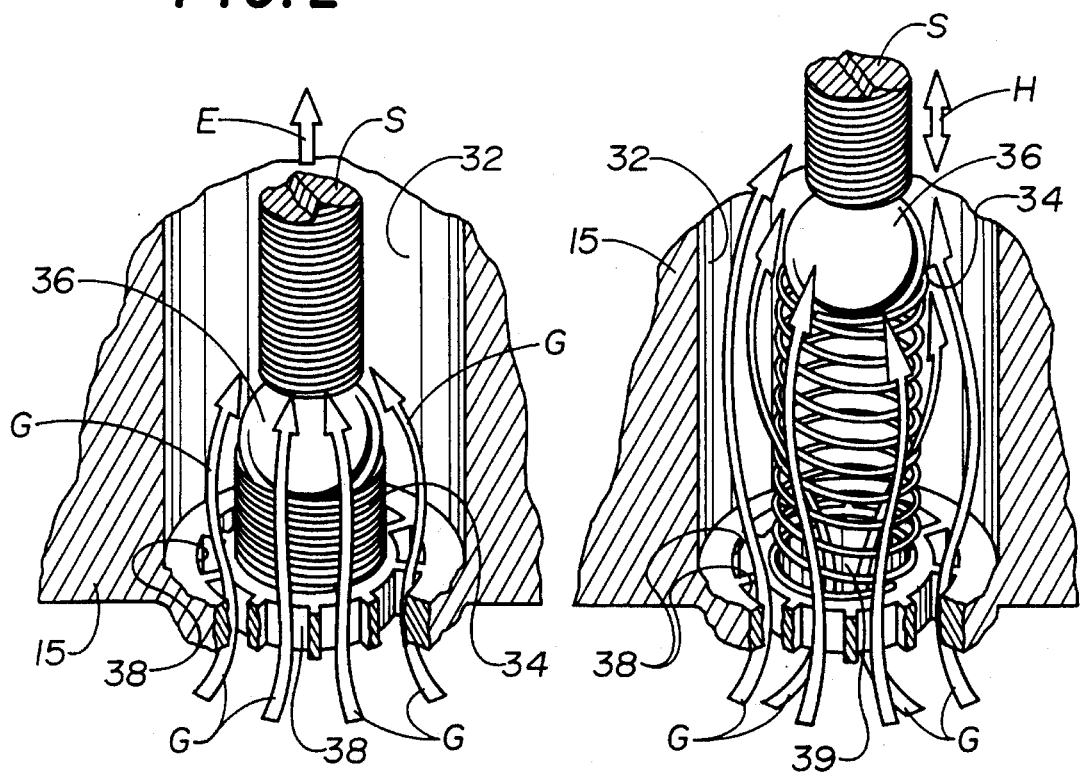
FIG. 4A is a detailed view in perspective of certain aspects of that which is shown in FIGS. 2 and 3 in another stage.
FIG. 4B shows that which is depicted in FIGS. 2, 3 and 4A in another stage, and in perspective.

FIG. 4A shows greater detail of the migration pattern of the viscous substance through the weep holes 38 which are integrally formed with the bottom of the piston 15. As shown, the weep holes 38 are actually apertures formed in an integral mass defining the piston 15. These weep holes 38

(along with a central weep hole 39 shown in FIG. 4B) control the degree to which the viscous substance moves in and out of the bore 32. This migration phenomena can be enhanced by judicious selection of spring 34. In FIG. 4A the arrow E reflects the FIG. 3 scenario where the bolt shaft S has just stopped being inserted (allowing the viscous substance past the check ball 36) and is about to be ejected because the spring 34 has been compressed to its maximum extent and the ball check valve 36 is at its lowermost portion. When the bolt shaft S is removed, the viscous substance migrates up through the weep holes 38 (and through the central bore 39 shown by the arrows G) past the shelf forming the holes 38 and bore 39.

FIG. 4B shows the scenario where the spring 34 and check ball 36 are past a midpoint in the stroke so that the shaft is still capable of being manipulated in either of two directions suggested by the double headed arrow H. If the threaded bolt shaft S is moved vertically upward, the viscosity of the liquid tends to lag behind the check ball and the check ball rises with a minimum amount of the viscous substance leading the way or allowing seepage of the viscous substance out of the bolt hole ball stop 30 of the cap 20. However, when the threaded shaft S is pressed vertically downwardly, there is sufficient clearance between the check ball 36 and the bore 32 so that the viscous substance moves up around the check ball. This allows coating of the threaded exterior of bolt shaft S because of clearance between check ball 36 and bore 32. However, because the clearance between the bolt shaft S and the bolt hole ball stop 30 on the cap 20 is minimal, when the shaft is retracted by moving upwardly (arrow E, FIG. 3 or vertically upward along arrow H, FIG. 4B), and because there is substantially no "lag time" between the threaded bolt S being extracted and its being followed by the ball check 36 (because of the compression chosen for the spring 34) a negligible amount of excess viscous substance migrates beyond the check valve 36 before it nests against the ball stop bolt hole 30. The majority of viscous substance is scraped off the shaft S by bore 30 and passes below check valve 36 via clearance with bore 32.

In view of the foregoing, it should now be evident that a premium will have been placed on correctly dimensioning the bolt shaft S to that of the bolt hole 30 in order to minimize the degree to which the viscous substance migrates beyond the device 10. Moreover, by having the bolt hole 30 closely match in tolerance the diameter of the bolt shaft S, a uniform, minimal thickness of viscous substance penetrates into the threads of the threaded bolt. This provides maximum benefit when the viscous substance is an anti-sieze compound. In this way, optimal coatings will have been made on the bolt shaft S and the minimal waste will have occurred by migration of the viscous substance outside the device 10. Most of the alternative embodiments to be discussed hereinafter take cognizance of the benefits that attend having a bolt hole closely correspond to the cross-sectional diameter of the threaded shaft S.

Figure 5:
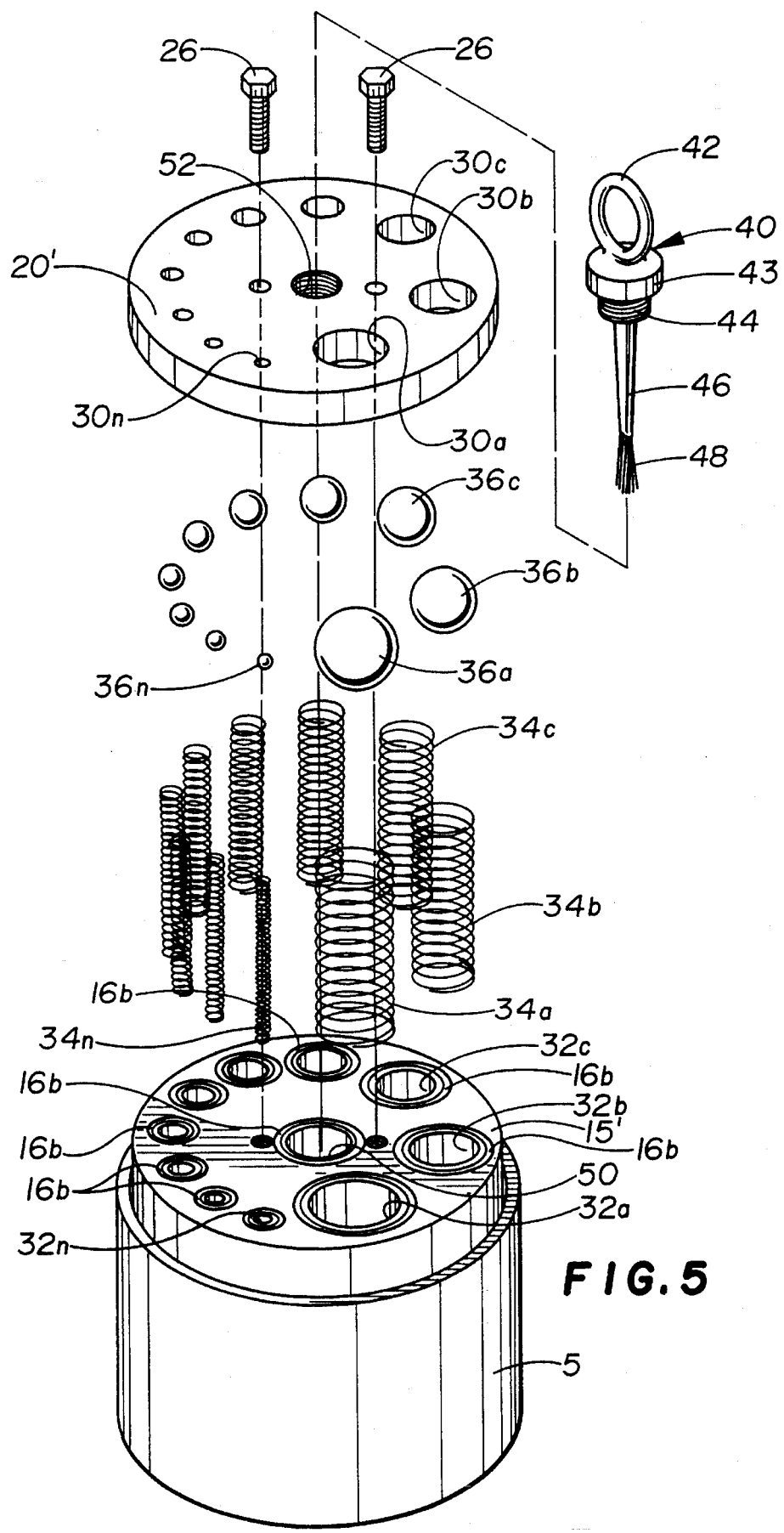
FIG. 5 is an exploded parts perspective of the apparatus according to the present invention in a second embodiment.

For example, FIG. 5 reflects an embodiment in which a multiplicity of bolt shafts S each having a different cross-sectional diameter can be used with a modified form of the apparatus so that the optimal coating will be deposited on the exterior surface of the bolt shaft and a minimum amount of the viscous substance will escape from outside the well in using the device. In this drawing figure, only the salient differences between the first discussed embodiment will be developed so as to not obscure the stark contrast that exists between the first and second embodiment.

Thereshown, a plurality of bores 32a, b, c . . . n are provided along the outer portion of the piston 15'. Thus, a multiplicity of different bolt shafts Sa, b, c . . . n each will have a bore which has been dimensioned specifically for that bolt shaft S. Additionally, each of the respective bores 32n has a respective matched spring. A series of springs 34a, b, c . . . n are dimensioned to match with the bores 32a . . . n. Also, check balls 36a . . . n are similarly matched for the given bore to provide optimal clearance as was afforded by the FIG. 1 embodiment. Similarly, the cap 20' has a similar series of bolt hole/ball stops 30a, b, c . . . n similarly placed in vertical registry with the bores 32n, springs 34n, and check balls 36n.

One nuance of the FIG. 5 version not apparent in the FIG. 1 embodiment involves a brush 40 which may be disposed in coincident and balanced with the vertical center of mass of the FIG. 5 coating device 10'. In this version, the brush 40 includes a ring 42 and a topmost extremity, a threaded portion 44 disposed below the ring and separated therefrom by a ring cap 43, and a stem portion 46 extending centrally down from the threaded portion 44 which terminates in an end having a multiplicity of bristles 48. The brush 40 communicates with a central brush hole 50 located within the piston 15' allowing access to the well 5. Brush hole 50 is in underlying registry with a threaded bore 52 carried on the cap 20'. Bore 52 has threads complemental to the threads 44 on the brush. When the brush 40 is threadedly engaged with the cap 20', the ring 42 can be used to carry the device 10' from one location to another. The tendency of the piston 15' is to stay within the well 5 by virtue of the viscosity and the suction provided by the viscous substance in conjunction with the check ball valves so that the device 10' will remain unitary.

Figure 6:
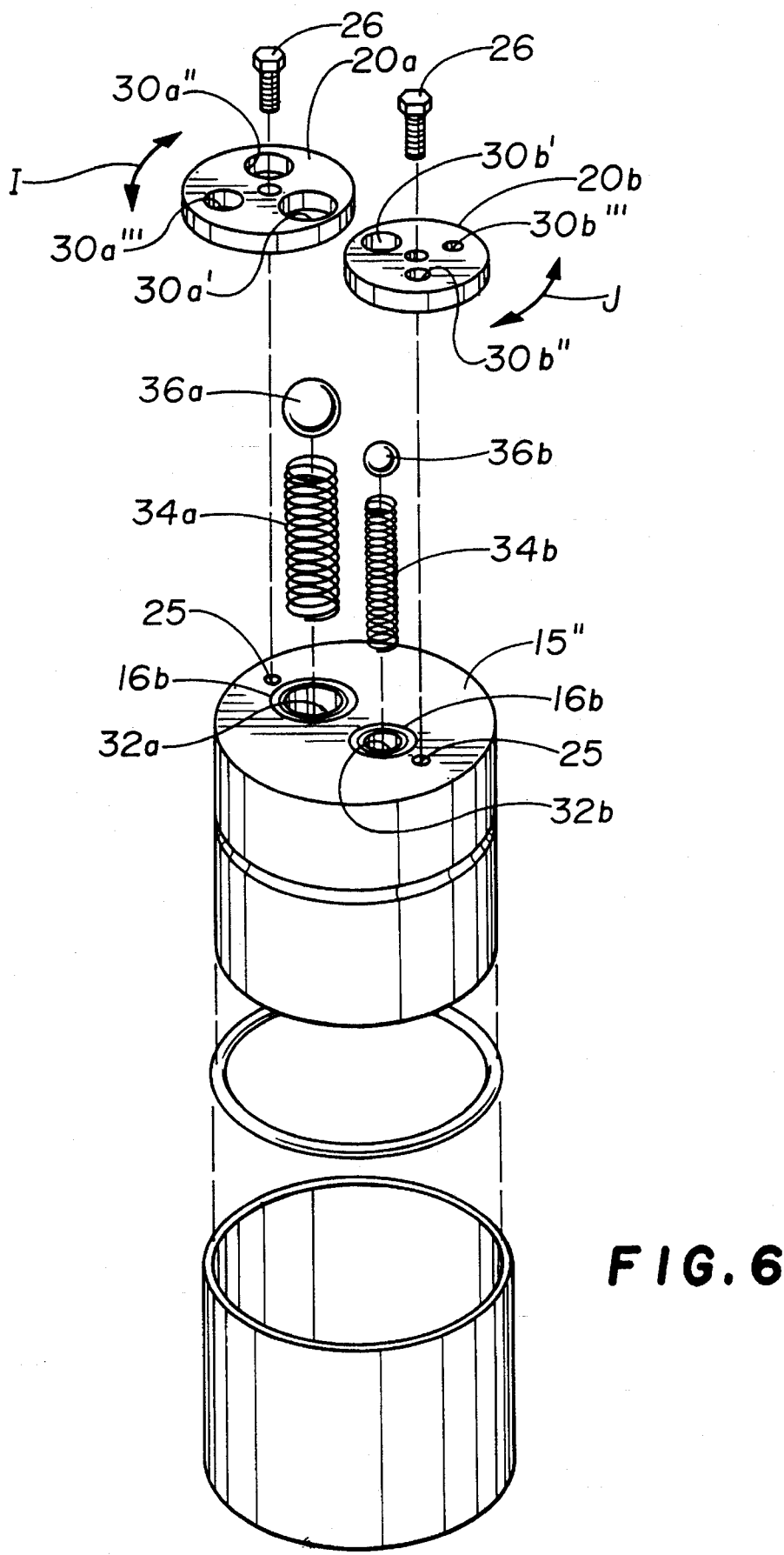
FIG. 6 is an exploded parts perspective of the apparatus according to the present invention according to a third embodiment.

FIG. 6 is another variant illustrating another possibility to achieve the same desiderata of the FIG. 5 version which is primarily to accommodate a multiplicity of different bolt shafts S within a single device. Thereshown is a modified piston 15" having just two bores 32a, 32b and which communicate with just two caps 20a, 20b. Each cap 20a, 20b is secured to the piston by means of a threaded screw 26 which coacts with a threaded bore 25 which has been placed in the piston 15". Generally, the caps 20a and 20b are each provided with a multiplicity of bolt hole/ball stops 30 adapted to overlie the bores 32. More specifically, the cap 20a includes three ball stop/bolt holes 30a', 30a" and 30a'". These ball stop/bolt holes circumscribe the threaded screw 26 so that the cap 20 is adapted to rotate along the double ended arrow I. In this way, an appropriately dimensioned ball stop/bolt hole 30 cooperates with bore 32a to achieve a tight clearance between the bolt shaft S and the cap 20a. Similarly, the cap 20b is provided with a multiplicity of holes 30b', 30b", 30b'" adapted to overlie bore 32b by means of pivotal manipulation of the cap plate 20b along the direction of the double ended arrow J. Each bore 32a, b includes a spring 34a, b and a check ball 36a, b.

With respect to FIG. 7, an additional modification should now be evident. In this version, the piston 15'" includes a non-foraminous top surface 18'" and a bottom surface which is substantially open and therefore not the massive monolith of the previous examples since all non-bore areas have been hollowed out. This is an example where the piston 15'" would have been formed from injection molding techniques where an attempt will have been made to avoid wall thicknesses that are not uniform along the entire extent of the body. With a uniform wall thickness provided everywhere, the injection molding process provides a uniform cure rate during injection molding. Because of the degree to which there has been hollowed out portions of the piston 15'", the bottom surface 14'" should be supplemented with a panel 17 attached thereto. In this event screws 26 connect the bottom panel 17 to the piston 15''' in the same manner that the cover 20 had been fastened to the top surface of the earlier embodiments. The salient difference therefore is that the bottom panel 17 captures the springs in tension thereagainst and the balls 32 are first placed into the piston 15'''. While the bottom panel 17 has been shown to be substantially foraminous it is also contemplated that the bottom plate could have a multiplicity of openings that are narrower than the bores 32 in the piston 15'''.

Attention is directed therefore to FIG. 7A which shows the means by which the check balls 36 can be captured within the topmost portion of the piston 15'''. In this version, the check ball 36 abuts against a shoulder 41 which is a conically tapering seat that extends between the substantially cylindrical bore 32 as it transitions to the opening 30 at the top of the piston 15'''.

The FIG. 7A shoulder 41 could be used in the FIG. 1, 5 and 6 variations. FIGS. 1, 5 and 6 reflect the potential desirability of an O-ring 16b circumscribing bores 32, 32a and 32b to preclude the migration of viscous substance therebeyond. As shown, O-rings may employed adjacent the FIG. 1, 5 or 7 versions.

FIG. 7B reflects a variant of FIG. 7A. A stem 37' parallels the FIG. 7A version but the notch 35 is cup-shaped having a blind bore 35' and a substantially cylindrical check "ball" 36b preferably having a mitered should 36c between the cup-shaped bore 35' and ball 36b.

Note that FIG. 7A also reflects another alternative embodiment in which a check ball 36a includes a centering notch 35 at a topmost surface to receive the bolt shaft S directly therein to minimize the degree to which the ball will tend to migrate to either side of the bore 32. The effect of such unwanted migration may be that the bolt shaft S also skews from the check ball 36a and could in conjunction with ball 36 wedge with the bore 32. Thus, when the centering notch 35 receives the free end of the bolt shaft S, it is more likely that the check ball 36a will translate linearly in the presence of force placed upon the bolt shaft S.

In addition, the ball 36a is equipped with a stem 37 which extends within spring 34 to provide another constraint on the degree to which the ball and spring arrangement will wander laterally within the bore 32.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A device for coating the exterior of an elongate shaft with a viscous substance, comprising, in combinations:

a well containing the viscous substance, said well including a bottom wall having a perimeter edge and a peripheral wall which extends linearly from said perimeter edge and terminates in peripheral lip at a top portion of said peripheral wall remote from said bottom wall, a piston dimensioned to be received within said peripheral wall, said piston having an exterior surface complemental to an interior of said peripheral wall to facilitate telescoping interengagement therebetween, said piston having a top surface and a bottom surface on respective top and bottom extremities of said piston exterior surface, a bore in said piston passing through both said top and bottom surfaces and containing the viscous substance within the bore, and check valve means in an upper portion of said bore, said check valve being spring biased to urge said check valve against a seat adjacent a topmost bore portion and near the top surface of the piston, said bore dimensioned to receive said elongate shaft therewithin, whereby said elongate shaft overcomes said check valve in entering said bore and is coated with the viscous substance contained in said bore.

2. The device of claim 1 including means for limiting the amount of viscous substance coated on said elongate shaft.

3. The device of claim 2 wherein said means to limit the amount of viscous substance coated on the elongate shaft also includes means to minimize migration of the viscous substance beyond said bore by thwarting the migration of the viscous substance outside said piston.

4. The device of claim 3 wherein said check valve means includes a check ball arranged to abut against said seat adjacent said topmost bore portion, and a spring in underlying registry urging said check ball upwardly against said seat adjacent said topmost bore portion, said spring having an abutment shelf at a lowermost bore portion.

5. The device of claim 4 wherein a multiplicity of said bores are provided, each said bore having its own said check valve means with said check ball and said spring and at least one cover plate is fixed to a the top surface of said piston which captures said check balls and springs within said piston, said cover plate having cover holes therein.

6. The device of claim 5 wherein two such cover plates are carried on the top surface of said piston, each having cover holes arranged to be placed in overlying registry with said bores for selectively receiving said elongate shaft dependent on the cross-sectional diameter of said elongate shape therewithin.

7. The device of claim 4 wherein a panel underlies said piston and multiple bores are provided to contain multiple said springs and said check balls in fixed relationship therewith, said piston is substantially hollowed except for a plurality of tubes whose interiors define said bores.

8. A device for coating a shaft with a viscous substance, comprising in combination:

an open topped well containing the viscous substance therewithin, a piston having spaced parallel topmost and lower planer surfaces and a plurality of bores extending through said planar surfaces, said piston placed in said well such that the lower planer surface is adapted to float on the viscous surface, sealing means between said piston and said well to thwart migration of the viscous substance therebtween, and check valve means in said plurality of bores to control the through passage of the shaft and the viscous substance there beyond.

9. The device of claim 8, including means for limiting the amount of viscous substance coated on the shaft wherein said means to limit the amount of viscous substance coated on said shaft also includes means to minimize migration of the viscous substance beyond each said bore by thwarting the migration of the viscous substance outside said piston.

10. The device of claim 9 wherein said check valve means includes a check ball arranged to abut against a seat adjacent said topmost bore portion and near the topmost surface of said piston and a spring in underlying registry urging said check ball upwardly against said seat adjacent said topmost bore portion, said spring having an abutment shelf at a lowermost bore portion.

11. The device of claim 10 wherein, each said bore having its own said check valve means with said check ball and said spring and at least one cover plate is fixed to the topmost surface of said piston which captures said check balls and springs within said piston, said cover plate having cover holes therewithin.

12. The device of claim 11 wherein two such cover plates are carried on the topmost surface of said piston, each having cover holes arranged to be placed in overlying registry with said bores for selectively receiving the dependent on the cross-sectional diameter of the shaft therewithin.

13. The device of claim 10 wherein a panel underlies said piston and multiple bores are provided to contain multiple said springs and said check balls in fixed relationship therewith, said piston is substantially hollowed except for a plurality of tubes whose interiors define said bores.

14. The device of claim 13 including a central brush disposed within said piston and having a threaded member arranged to engage a complementarily threaded bore passing through said piston and allowing communication with the viscous substance.

* * * * *